(12) United States Patent
Choi et al.

(10) Patent No.: US 12,305,287 B2
(45) Date of Patent: May 20, 2025

(54) PLATED STEEL SHEET HAVING EXCELLENT STRENGTH, FORMABILITY AND SURFACE PROPERTY AND METHOD FOR MANUFACTURING SAME

(71) Applicant: POSCO CO., LTD, Pohang-si (KR)

(72) Inventors: Yong-Hoon Choi, Gwangyang-si (KR);
Yu-Mi Ha, Gwangyang-si (KR);
Seong-Ho Han, Gwangyang-si (KR);
Jun-Sung Yeom, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/266,267

(22) PCT Filed: Dec. 2, 2021

(86) PCT No.: PCT/KR2021/018102
§ 371 (c)(1),
(2) Date: Jun. 8, 2023

(87) PCT Pub. No.: WO2022/131635
PCT Pub. Date: Jun. 23, 2022

(65) Prior Publication Data
US 2024/0043952 A1 Feb. 8, 2024

(30) Foreign Application Priority Data
Dec. 15, 2020 (KR) .................. 10-2020-0175088

(51) Int. Cl.
*C23C 2/28* (2006.01)
*B32B 15/01* (2006.01)
(Continued)

(52) U.S. Cl.
CPC .............. *C23C 2/28* (2013.01); *B32B 15/013* (2013.01); *C21D 1/84* (2013.01); *C21D 6/005* (2013.01);
(Continued)

(58) Field of Classification Search
None
See application file for complete search history.

(56) References Cited

U.S. PATENT DOCUMENTS

2006/0292391 A1\* 12/2006 Ikematsu ............... C22C 38/58
427/433
2010/0084057 A1 4/2010 Furuhashi et al.
(Continued)

FOREIGN PATENT DOCUMENTS

JP 2002060917 2/2002
JP 2004018971 A \* 1/2004
(Continued)

OTHER PUBLICATIONS

European Search Report—European Application No. 21906940.8 issued on May 8, 2024, citing JP 2013-076132, JP 2014-015651, KR 10-1449135, and WO 2004/003247.
(Continued)

*Primary Examiner* — Seth Dumbris
(74) *Attorney, Agent, or Firm* — CANTOR COLBURN LLP (57) ABSTRACT

Provided is a plated, ultra-low carbon steel sheet which has excellent strength, formability, and surface properties to allow for the weight lightness of automobiles and a manufacturing method therefor and, more specifically, to a galvanized steel sheet and a manufacturing method therefor, wherein the galvanized steel sheet has high strength and high formability and as such, can be suitably used as a material for an automobile outer body.

6 Claims, 3 Drawing Sheets

(51) Int. Cl.
  *C21D 1/84* (2006.01)
  *C21D 6/00* (2006.01)
  *C21D 8/02* (2006.01)
  *C21D 9/46* (2006.01)
  *C22C 38/00* (2006.01)
  *C22C 38/02* (2006.01)
  *C22C 38/04* (2006.01)
  *C22C 38/06* (2006.01)
  *C22C 38/12* (2006.01)
  *C22C 38/14* (2006.01)
  *C22C 38/16* (2006.01)
  *C23C 2/06* (2006.01)
  *C23C 2/26* (2006.01)

(52) U.S. Cl.
  CPC ............ *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C23C 2/06* (2013.01); *C23C 2/26* (2013.01); *C21D 2211/005* (2013.01); *C21D 2211/009* (2013.01)

(56) References Cited

U.S. PATENT DOCUMENTS

| | | |
|---|---|---|
| 2011/0073223 A1 | 3/2011 | Sohn et al. |
| 2014/0342182 A1 | 11/2014 | Miyata et al. |

FOREIGN PATENT DOCUMENTS

| | | | |
|---|---|---|---|
| JP | 2007009235 A | | 1/2007 |
| JP | 2008214656 A | * | 9/2008 |
| JP | 2008214700 A | | 9/2008 |
| JP | 2013076132 A | | 4/2013 |
| JP | 2013076148 | | 4/2013 |
| JP | 2013076148 A | * | 4/2013 |
| JP | 2014015651 A | | 1/2014 |
| JP | 2015101776 | | 6/2015 |
| KR | 20050063917 | | 6/2005 |
| KR | 20070023995 | | 3/2007 |
| KR | 20090110500 | | 10/2009 |
| KR | 20090113344 | | 10/2009 |
| KR | 20090118290 | | 11/2009 |
| KR | 20140053318 | | 5/2014 |
| KR | 101449135 B1 | | 10/2014 |
| WO | 2004003247 A1 | | 1/2004 |

OTHER PUBLICATIONS

International Search Report—PCT/KR2021/018102 dated Mar. 21, 2022.

Japanese Office Action—Japanese Application No. 2023-535995 issued on Jul. 30, 2024, citing JP 2008-214700, JP 2008-214656, and JP 2007-009235.

* cited by examiner

PLATED STEEL SHEET HAVING EXCELLENT STRENGTH, FORMABILITY AND SURFACE PROPERTY AND METHOD FOR MANUFACTURING SAME

TECHNICAL FIELD

The present disclosure relates to a plated steel sheet of ultra-low carbon steel having excellent strength, formability, and surface properties, capable of realizing a decrease in weight of a vehicle, and a method for manufacturing the same, and more particularly, to a zinc-based plated steel sheet having high strength and high formability that may be suitably used as an external plate material of a vehicle, and a method for manufacturing the same.

BACKGROUND ART

Cold-rolled steel sheet processed by pressing or the like may be used as an external plate material of a vehicle, and high formability may be generally required therefor. In recent, as a carbon dioxide emission control measure from the viewpoint of preventing global warming, a new target for improving fuel costs for a vehicle has been set, and there is a demand for improving fuel efficiency of a vehicle, such as introduction of preferential taxation for low fuel consumption vehicles, or the like. To improve the fuel efficiency of a vehicle, a decrease in weight of a vehicle body may be an effective means, and from the viewpoint of such a decrease in weight, slimming of a steel sheet for the vehicle body has been demanded. On the other hand, from the viewpoint of ensuring stability of the vehicle body, high strength of the steel sheet for the vehicle body may be required. As the steel sheet for the vehicle body that satisfies requirements for slimming and high-strength of the steel sheet and is pressed into a complex shape, a high-strength zinc-based plated steel sheet having excellent surface appearance and good press formability may be required.

In order to improve formability of a steel sheet for the vehicle, there may be so-called interstitial free (IF) steel that improves formability by adding Ti or Nb alone or in combination to a ultra-low carbon cold-rolled steel sheet, and precipitating a solid-solution element such as C, N, S, or the like in forms of carbides and nitrides, to increase elongation and a plastic deformation ratio. Therefore, in the past, as well as achieving high purification in a steelmaking operation, an aging phenomenon due to the solid-solution element is limited by a method of precipitating a solid-solution element by adding a carbonitride forming element such as Ti or the like. Further, in a high tensile steel sheet, in order to improve strength of the steel sheet, incorporation of solid-solution strengthening elements such as Si, Mn, P, or the like into the steel sheet has been performed.

Meanwhile, in order to manufacture a high-strength zinc-based plated steel sheet, annealing may be performed in a mixed atmosphere of hydrogen and nitrogen to secure a quality thereof. In such an annealing atmosphere, reduction of base iron (Fe) may occur, and an element that may be easy to oxidize, such as an element such as Si, Mn, Al, or the like, may react with $O_2$ or $H_2O$ contained in a small amount in the annealing atmosphere, to form an oxide. When the oxide is formed on a surface of the base iron, problems such as occurrence of non-plating, formation of non-uniform plating occur, or the like, during a subsequent plating process.

Therefore, a level of technology capable of satisfying demands for a zinc-based plated steel sheet having excellent surface properties, high strength, and high formability has not been developed until now.

(Patent Document 1) Korean Patent Publication No. 2005-0063917

SUMMARY OF INVENTION

Technical Problem

An aspect of the present disclosure is to provide a plated steel sheet having excellent surface properties, high strength, and high formability, and a method for manufacturing the same.

Objects of the present disclosure are not limited thereto. Anyone with ordinary knowledge in the technical field to which the present disclosure belongs will have no difficulty in understanding additional objects of the present disclosure from the contents throughout the present specification.

Solution to Problem

According to an aspect of the present disclosure, a plated steel sheet includes
a base iron; and
a plating layer formed on the base iron,
wherein the base iron includes, by weight, C: 0.003 to 0.009%, Si: 0.05% or less (excluding 0%), Mn: 0.4 to 1.0% (excluding 0%), P: 0.04 to 0.09%, S: 0.01% or less (excluding 0%), N: 0.005% or less (excluding 0%), Sol.Al: 0.1% or less (excluding 0%), Mo: 0.03 to 0.08%, Ti: 0.005 to 0.03%, Nb: 0.02 to 0.045%, Cu: 0.04 to 0.15%, B: 0.0015% or less (excluding 0%), balance of Fe, and other unavoidable impurities,
wherein the plated steel sheet satisfies the following relationships 1 and 2:

$$0 < 10 \times [Si]/[Mn] \leq 1.3 \quad \text{[Relationship 1]}$$

In relationship 1, [Si] represents an average weight % amount of Si in the base iron, and [Mn] represents an average weight % amount of Mn in the base iron.

$$0 \leq [Ao]/[At] \leq 0.15 \quad \text{[Relationship 2]}$$

In relationship 2, if a line from which an interface line having a length of 500 nm or more between the base iron and the plating layer is spaced 3 μm apart in a thickness direction facing the plating layer, is drawn, based on a cross-section of the plated steel sheet, [At] represents an area of a region between the spaced line and the interface line, and [Ao] represents an area occupied by an Mn—Si—O-based composite oxide in the region between the spaced line and the interface line.

According to another aspect of the present disclosure, a method for manufacturing a plated steel sheet, includes
continuously casting steel, and performing melting treatment on the steel to have a depth of 2 to 5 mm from a surface of the steel in a thickness direction, wherein the steel includes, by weight, C: 0.003 to 0.009%, Si: 0.05% or less (excluding 0%), Mn: 0.4 to 1.0% (excluding 0%), P: 0.04 to 0.09%, S: 0.01% or less (excluding 0%), N: 0.005% or less (excluding 0%), Sol.Al: 0.1% or less (excluding 0%), Mo: 00.3 to 0.08%, Ti: 0.005 to 0.03%, Nb: 0.02 to 0.045%, Cu: 0.04 to 0.15%, B: 0.0015% or less (excluding 0%), balance of Fe, and other unavoidable impurities, and satisfies the above-mentioned relationship 1;
reheating a steel slab obtained after the melting treatment at 1180 to 1230° C., and hot-rolling the reheated steel slab at Ar3 or higher to provide a hot-rolled steel sheet;

coiling the hot-rolled steel sheet at 600 to 650° C.;
cold-rolling the coiled hot-rolled steel sheet at a reduction ratio of 70 to 83% to provide a cold-rolled steel sheet;
annealing the cold-rolled steel sheet at 740 to 830° C.;
performing hot-dip zinc-based plating on the annealed cold-rolled steel sheet, and alloying and heat-treating a steel sheet having a zinc-based plating layer formed on a surface at 500 to 560° C.; and
temper-rolling the steel sheet at a reduction ratio of 0.6 to 1.2% using a skin pass roll having a roughness (Ra) of 1.0 to 1.6 µm.

Advantageous Effects of Invention

According to an aspect of the present disclosure, a plated steel sheet having excellent surface properties, high strength, and high formability, and a method for manufacturing the same may be provided.

Various advantages and effects of the present disclosure are not limited to the above description, and will be more easily understood in the process of describing specific embodiments of the present disclosure.

BEST MODE FOR INVENTION

Hereinafter, preferred embodiments of the present disclosure will be described. However, embodiments of the present disclosure may be modified in many different forms, and the scope of the present disclosure is not limited to embodiments described below. In addition, embodiments of the present disclosure may be provided to more completely explain the present disclosure to those skilled in the art.

As a result of in-depth research to solve the problems of the aforementioned prior art, the present inventors have confirmed that, in steel, while usage of a solid-solution element such as carbon (C), nitrogen (N), sulfur (S), or the like may be minimized by adding titanium (Ti) and/or niobium (Nb), which are strong carbonitride forming elements, to secure formability, a high strength of 390 MPa or more may be secured by adding such as Si, Mn, P, or the like, which is a solid-solution strengthening element, and excellent plating properties may be secured by control of components and an alloying degree, and, have thus completed the present disclosure. Hereinafter, a high-strength alloyed hot-dip zinc-based plated steel sheet having excellent surface properties, which may be applied as a material for an external plate of a vehicle, and a method for manufacturing the same will be described in detail.

As a steel sheet for the vehicle, press formability such as deep drawability or the like as well as high tensile strength should be satisfied. A descaling rolled steel sheet used as a base material of the alloyed hot-dip zinc-based plated steel sheet according to the present embodiment may use a high-strength steel sheet to which ultra-low carbon steel is used as a basic component and a solid-solution strengthening elements such as Si, Mn, P, or the like is added, to improve processability.

For example, a plated steel sheet according to an aspect of the present disclosure may include a base iron; and a plating layer formed on the base iron. In this case, the base iron may include, by weight, C: 0.003 to 0.009%, Si: 0.05% or less (excluding 0%), Mn: 0.4 to 1.0% (excluding 0%), P: 0.04 to 0.09%, S: 0.01% or less (excluding 0%), N: or less (excluding 0%), Sol.Al: 0.1% or less (excluding 0%), Mo: 0.03 to 0.08%, Ti: 0.005 to 0.03%, Nb: to 0.045%, Cu: 0.04 to 0.15%, B: 0.0015% or less (excluding 0%), balance of Fe, and other unavoidable impurities. Hereinafter, a reason for adding the basic component of the iron base and a reason for its limitation will be described.

Carbon (C): 0.003 to 0.009%

C may be an interstitial solid-solution element, and may have a great influence on formation of a texture of the steel sheet during cold-rolling and annealing. When an amount of carbon dissolved in the steel sheet increases, growth of a grain having a {111} gamma (γ)-fiber texture, which may be advantageous for a drawing processing, may be suppressed, and growth of a grain having a {110} and {100} texture may be promoted, to deteriorate drawability of an annealed sheet. Furthermore, when an amount of C exceeds 0.009%, amounts of Ti and Nb required to precipitate them as carbides may increase, which may be disadvantageous in terms of economic efficiency, and pearlite or the like may be generated, which may deteriorate formability. Therefore, an amount of C is limited to 0.009% or less. In addition, when an amount of C is less than 0.003%, sufficient strength may not be secured. Therefore, an amount of C is limited to 0.003% or more. More preferably, a lower limit of the amount of C may be 0.0038%, and an upper limit of the amount of C may be 0.0080%.

Silicon (Si): 0.05% or Less (Excluding 0%)

Si may be an element that contributes to an increase in strength by solid-solution strengthening. In order to exhibit an effect of increasing strength by such solid-solution strengthening, since Si should be added as needed, an amount of Si in the base iron is limited to more than 0%. When an amount of Si exceeds 0.05%, there may be a problem in that plating surface properties may be deteriorated by causing a surface scale defect. Therefore, in the present disclosure, an amount of Si is managed to 0.05% or less. More preferably, a lower limit of an amount of Si may be 0.01%, and an upper limit of an amount of Si may be 0.042%.

Manganese (Mn): 0.4 to 1.0%

Mn may be a solid-solution strengthening element that not only contributes to increase strength, but also serves to precipitate S in the steel sheet as MnS. When an amount of Mn is less than 0.4%, there may be a concern about a decrease in strength. When an amount of Mn exceeds 1.0%, surface problems due to oxides may occur. Therefore, an amount of Mn is limited to 0.4 to 1.0%. More preferably, a lower limit of an amount of Mn may be 0.48%, and an upper limit of an amount of Mn may be 0.80%.

Phosphorus (P): 0.04 to 0.09%

P may be the most effective element for ensuring strength of the steel sheet without significantly impairing drawability and having the most excellent solid-solution effect. When an amount of P is less than 0.04%, it is impossible to secure desired strength. When an amount of P exceeds 0.09%, secondary brittleness and surface streak defects due to P segregation may occur. Therefore, an amount of P is limit to 0.04 to 0.09%. More preferably, a lower limit of an amount of P may be 0.048%, and an upper limit of an amount of P may be 0.089%.

Molybdenum (Mo): 0.03 to 0.08%

Mo may be an element having a high affinity for P (phosphorus) and serves to suppress P segregation. In order to secure high strength in ultra-low carbon steel sheet, P should be used inevitably, and Mo may be appropriately added to improve surface defects caused by P segregation. When an amount of Mo is less than 0.03%, there may be no significant effect on desired surface improvement. In addition, when an amount of Mo exceeds 0.08%, costs thereof may be high and cost competitiveness may be reduced. Therefore, an amount of Mo is limited to 0.03 to 0.08%. More preferably, a lower limit of an amount of Mo may be 0.05%, and an upper limit of an amount of Mo may be 0.078%.

Sulfur (S): 0.01% or Less (Excluding 0%), Nitrogen (N): 0.005% or Less (Excluding 0%)

Since S and N may be inevitably added as impurities present in the steel sheet, in the base iron, amounts of S and N independently exceed 0%, respectively. Since it may be desirable to control the amounts as low as possible in order to secure excellent welding characteristics, in the present disclosure, an amount of S may be managed to 0.01% or less, and an amount of N may be managed to 0.005% or less. More preferably, a lower limit of an amount of S may be 0.0015%, and an upper limit of an amount of S may be 0.0034%. Also, more preferably, a lower limit of an amount of N may be and an upper limit of an amount of N may be 0.004%.

Aluminum (Al): 0.1% or Less (Excluding 0%)

Al may contribute to improving drawability and ductility of the steel sheet by precipitating AlN. In order to exhibit effects of improving drawability and ductility, an amount of Al in the base iron may exceed 0%. When an amount of Al exceeds 0.1%, there may be a problem in that an internal defect of the steel sheet due to excessive formation of Al inclusions occurs during an steelmaking operation. Therefore, an amount of Al may be controlled to 0.1% or less. More preferably, a lower limit of an amount of Al may be and an upper limit of an amount of Al may be 0.08%.

Titanium (Ti): 0.005 to 0.03%

Ti may be an element that greatly contributes to improving drawability of the steel sheet by reacting with solid-solution carbon and solid-solution nitrogen to precipitate a Ti-based carbonitride during hot-rolling. When an amount of Ti is less than 0.005%, carbonitrides may not be sufficiently precipitated, resulting in poor drawability. When an amount of Ti exceeds 0.03%, it may be difficult to manage inclusions during a steelmaking operation, and inclusion property defects may occur. Therefore, an amount of Ti is limited to 0.005 to 0.03%. More preferably, a lower limit of an amount of Ti may be 0.007%, and an upper limit of an amount of Ti may be 0.012%.

Niobium (Nb): 0.02 to 0.045%

Nb may be the most effective element that may create very fine grains by rolling and cooling processes, when an austenite region non-recrystallized region widens at high temperatures due to hot-rolling solute drag and precipitate pinning effects. When an amount of Nb is less than 0.02%, a range of an austenite non-recrystallization temperature region in the steel sheet may be narrowed, and a grain size refinement effect may be insignificant. When an amount of Nb exceeds 0.045%, high-temperature strength may increase, and there may be a problem of making hot-rolling difficult. Therefore, an amount of Nb is limited to 0.02 to 0.045%. More preferably, a lower limit of an amount of Nb may be 0.028%, and an upper limit of an amount of Nb may be 0.044%.

Boron (B): 0.0015% or Less (Excluding 0%)

B may be an element added to prevent secondary processing brittleness due to the addition of P in steel sheet, and an amount of B in the base iron may exceed 0%, to express an effect of preventing secondary processing brittleness. When an amount of B exceeds 0.0015%, ductility of the steel sheet may be reduced. Therefore, an amount of B is limited to 0.0015% or less. More preferably, a lower limit of an amount of B may be 0.0004%, and an upper limit of an amount of B may be 0.001%.

Copper (Cu): 0.04 to 0.15%

Cu may be also an element added to secure strength, and may be an element that may be difficult to remove the same, when adjusting a steel composition by steelmaking. Therefore, 0.04% or more of Cu may be added to secure strength. When an amount of Cu exceeds 0.15%, it may lead to grain boundary embrittlement or increase costs thereof. Therefore, an amount of Cu is limited to 0.15% or less. More preferably, a lower limit of an amount of Cu may be 0.06%, and an upper limit of an amount of Cu may be 0.10%.

In addition, the remainder may include Fe and unavoidable impurities. Addition of effective ingredients other than the above composition may not be excluded. The unavoidable impurities may be included as long as they may be unintentionally mixed in a typical manufacturing process of a plated steel sheet. Since those skilled in the art may easily understand a meaning thereof, it is not particularly limited thereto.

In addition, the plated steel sheet may satisfy the following relationship 1.

$$0<10\times[Si]/[Mn]\leq 1.3 \qquad \text{[Relationship 1]}$$

(In the relationship 1, [Si] represents an average weight % amount of Si in the base iron, and [Mn] represents an average weight % amount of Mn in the base iron.)

For example, when a value of 10×[Si]/[Mn] defined from the above relationship 2 exceeds 1.3, since surface Si oxides accumulate during annealing and plating wettability deteriorates, a surface defect may occur due to non-plating or plating non-uniformity in a final product. It may be believed that since Si easily undergoes an oxidation reaction, as compared to Mn, Si alone and a composite oxide thereof may be easily formed during annealing, resulting in surface defects. From the viewpoint of further improving the above-mentioned effect, more preferably, a lower limit of an amount of 10×[Si]/[Mn] value may be 0.48, and an upper limit of an amount of 10×[Si]/[Mn] value may be 0.68.

The present disclosure may satisfy the above-described component system, to effectively provide a high-strength, ultra-low-carbon alloyed, hot-dip zinc-based plated steel sheet for an external plate of a vehicle having excellent formability.

For example, the present disclosure relates to an alloyed hot-dip zinc-based plated steel sheet using a high-tensile steel sheet containing ultra-low carbon steel as a basic component and reinforcing elements such as Si, Mn, P, or the like, to improve formability as a base material (a base iron). As such, in order to prevent formation of unplated and non-uniform plating layers due to oxides on a surface of the base iron, the present disclosure may appropriately control a composition and an alloying degree, to effectively provide an alloyed hot-dip zinc-based plated steel sheet for an external plate of a vehicle having an excellent surface appearance, and a method for manufacturing the same.

The plated steel sheet may satisfy the following relationship 2. By satisfying the following relationship 2, the plated steel sheet according to the present disclosure may stably control a ratio of interface oxides near a interface between the base iron and the plating layer, to ensure excellent surface properties.

$$0 \leq [Ao]/[At] \leq 0.15 \quad \text{[Relationship 2]}$$

(In relationship 2, if a line from which an interface line having a length of 500 nm or more between the base iron and the plating layer is spaced 0.3 μm apart in a thickness direction facing the plating layer, is drawn, based on a cross-section of the plated steel sheet, [At] represents an area of a region between the spaced line and the interface line, and [Ao] represents an area occupied by an Mn—Si—O-based composite oxide in the region between the spaced line and the interface line.)

When a value of [Ao]/[At] exceeds 0.15, plating wettability may deteriorates due to a surface oxide, and a surface defect may occur due to non-plating or non-uniform plating. Since the present disclosure may include a case in which no Mn—Si—O-based composite oxide exists near the interface between the base iron and the plating layer, a lower limit of an amount of [Ao]/[At] value defined by the relationship 2 may be 0. (For example, the [Ao]/[At] value may include 0, and the fact stating that [Ao]/[At] value is 0 means that the Mn—Si—O-based composite oxide is not included near the interface between the base iron and the plating layer.

A lower limit of an amount of value of [Ao]/[At] may be 0%, and an upper limit of an amount of value of [Ao]/[At] may be 0.08. Alternatively, in a case in which the Mn—Si—O-based composite oxide exists near the interface between the base iron and the plating layer, a lower limit of an amount of value of [Ao]/[At] is more preferably 0.001%.

In the present specification, the thickness direction may mean a direction, perpendicular to a rolling direction. In addition, the length of the interface line for calculating [Ao] and [At] of the relationship 2 may be 500 nm or more. In this case, it may mean a value obtained by measuring an entire length of the interface line drawn along a boundary between the base iron and the plating layer, based on a cross-section of the plated steel sheet. Therefore, when [Ao] and [At] values defined in relationship 2 are measured, it may be measured based on the fact that the total length of the interface line is 500 nm or more.

Figure 4:
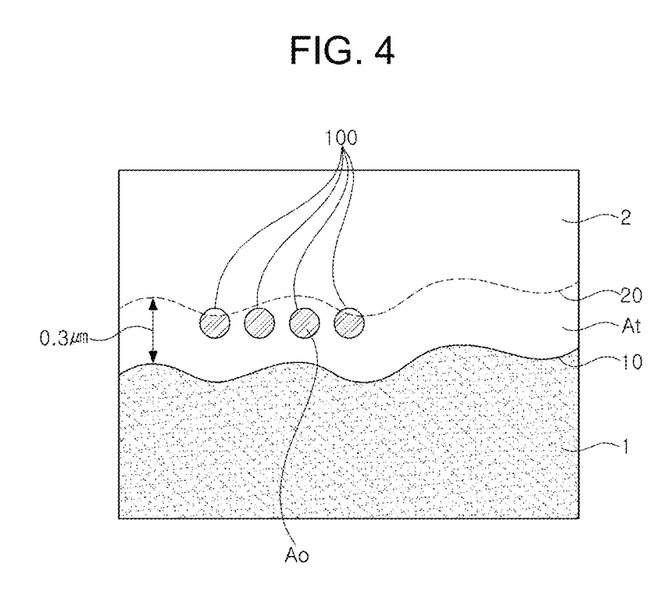
FIG. 4 is a view schematically illustrating a measurement method of relationship 2.

A method for measuring [Ao] and [At] defined in the relationship 2 is schematically illustrated in FIG. 4. For example, after drawing an interface line 10 having a total interface length of 500 nm or more between a base iron 1 and a plating layer 2, based on a cross-section in a thickness direction of a plated steel sheet, a line 20 from which the interface line 10 is 0.3 μm spaced apart in a direction, parallel to the thickness direction, is drawn. From this, an area At of a region between the interface line 10 and the spaced line 20 may be obtained, and an area Ao occupied by an Mn—Si—O-based composite oxide 100 existing in the region between the interface line 10 and the spaced line 20 may be obtained. In this case, the cross-section of the plated steel sheet may be observed using a measuring device such as an EDS or the like, to clearly see a peripheral region of a boundary between the base iron 1 and the plating layer 2. For example, a value of Ao can be confirmed by obtaining an area of a region corresponding to a hatched portion of FIG. 4.

In addition, a unit of [Ao]/[At] defined in the relationship 2 may be sufficient as long as a unit of [Ao] and a unit of [At] are unified. For example, if the unit of [Ao] is $\mu m^2$, the unit of [At] may be also unified to $\mu m^2$, and if the unit of [Ao] is $nm^2$, the unit of [At] may be also unified to $nm^2$, then the value of [Ao]/[At] may be obtained.

As a result of repeated research by the present inventors, it has been found that generation of the Mn—Si—O-based composite oxide may be suppressed by a specific amount or less in the peripheral region of the interface between the base iron and the plating layer, to provide a plated steel sheet having excellent surface properties and high strength. Therefore, by satisfying the above-mentioned relationship 2, it is possible to extend an application range of the high-strength cold-rolled steel sheet containing P to a vehicle body to a range that has never been applied (for example, to a side outer or the like), to realize a more decrease in weight of the vehicle body.

In this case, the Mn—Si—O-based composite oxide may be $Mn_aSiO_{2+a}$, where a is a real number that satisfies $0<a\leq 2$. For example, the Mn—Si—O-based composite oxide may be $MnSiO_3$, $Mn_2SiO_4$, $Mn_{0.9}SiO_{2.9}$ (i.e., $0.9MnO \cdot SiO_2$), or the like.

According to an aspect of the present disclosure, an average diameter of the Mn—Si—O-based composite oxide may be 200 nm or less. When the average diameter of the Mn—Si—O-based composite oxide exceeds 200 nm, there may be a problem of occurrence of a point-like non-plating defect. Since the smaller the Mn—Si—O-based composite oxide is, the more advantageous it is to prevent a surface defects, a lower limit of an amount of average diameter is not particularly limited. In terms of further improving the above effect, an upper limit of an amount of average diameter of the Mn—Si—O-based composite oxide may be 100 nm, and a lower limit of an amount of average diameter of the Mn—Si—O-based composite oxide may be 0 nm (e.g., referring to a case in which the number of Mg—Si—O-based composite oxide is 0).

In this case, the average diameter of the Mn—Si—O-based composite oxide may mean an average value of values measured for a circle equivalent diameter for the above-described Mn—Si—O-based composite oxide, based on a cut surface in a thickness direction (i.e., a direction, perpendicular to a rolling direction) of the plated steel sheet.

Further, according to an aspect of the present disclosure, when the line spaced apart from the boundary line between the base iron and the plating layer by 0.3 μm in the thickness direction of the plating layer is drawn on the cut surface of the plated steel sheet, the line spaced from the interface line, the area occupied by the Mn—Si—O-based based composite oxide may be larger than an area occupied by the Mn—Si—O-based composite oxide in a region between the spaced line and the surface line of the plating layer. It may be believed that this is because the above-mentioned Mn—Si—O-based composite oxide is mainly formed on a surface of the base iron during annealing in the manufacturing process, and exists near the interface between the base iron and the plating layer during hot-dip zinc-based plating.

According to an aspect of the present disclosure, since the iron base corresponds to an ultra-low carbon steel sheet having an amount of C of less than 0.01%, the base iron may have a ferrite-based microstructure. In this case, the ferrite-based microstructure may include other structures that may be inevitably generated.

Specifically, according to an aspect of the present disclosure, the microstructure of the base iron may have an area fraction of 95% or more of ferrite, and in addition, a small amount of pearlite or the like may remain (e.g., the balance may be pearlite). Alternatively, more preferably, in the microstructure of the base iron, ferrite may be 99% or more, and pearlite may be 1% or less, based on an area fraction. Alternatively, most preferably, the microstructure of the base iron may be a single phase of the ferrite. By satisfying these microstructural characteristics, excellent formability may be secured. For example, when an amount of the microstructure of pearlite or the like, other than the above-described ferrite, in the base iron exceeds 5%, a problem of deterioration in formability may occur.

According to an aspect of the present disclosure, although not particularly limited, in the base iron, an average grain size of the ferrite may be 5 to 15 μm (i.e., 5 μm or more and 15 μm or less). When the average grain size of the ferrite is less than 5 μm, strength may be too high, and elongation may not be sufficiently secured. In addition, when the average grain size of the ferrite exceeds 15 μm, a problem of not securing a target strength may occur. In terms of further improving the above effect, a lower limit of the average grain size of the ferrite may be 6 μm, and an upper limit of the average grain size of the ferrite may be 10 μm.

In this case, the average grain size of the ferrite may mean an average value of values obtained by measuring diameters of crystal grains in the thickness direction (i.e., a direction, perpendicular to the rolling direction) of the plated steel sheet.

In the present specification, the above-mentioned circle equivalent diameter may mean a value obtained by measuring a particle diameter assuming a spherical particle drawn with the longest length penetrating an internal space of the crystal grain as the particle diameter.

According to an aspect of the present disclosure, the plating layer may be a hot-dip zinc-based plating layer or a zinc-based alloy plating layer. Although not particularly limited, as an example, the plating layer may have a composition including, by weight, Fe: 8 to 13%, the balance Zn, and other unavoidable impurities, and excellent powdering property may be easily secured by satisfying the above-described composition of the plating layer.

According to an aspect of the present disclosure, tensile strength of the plated steel sheet may be 390 MPa or more (more preferably 390 to 480 MPa). As such, since the tensile strength of the plated steel sheet satisfies the range of 390 to 480 MPa, it is possible to realize a decrease in weight of a vehicle using high tensile steel.

Further, according to an aspect of the present disclosure, elongation of the plated steel sheet may be 15% or more, more preferably 28 to 43%, and most preferably 28 to 38%. As such, when the elongation of the plated steel sheet satisfies the aforementioned range, excellent formability and processability may be secured.

Next, a method for manufacturing a plated steel sheet will be described in detail. However, this does not mean that a plated steel sheet of the present disclosure should be manufactured by the following manufacturing method.

A method for manufacturing a plated steel sheet according to an aspect of the present disclosure may include continuously casting steel having the above-described composition, and description of the composition of the plated steel sheet, described above, may be equally applicable to a composition of the steel.

In addition, after the continuously casting steel, it is possible to perform a cutting process of 2 mm or more and 5 mm or less in the thickness direction (at this time, the thickness direction means a direction, perpendicular to the rolling direction) from a surface of the steel. When a thickness to be performed by melting treatment is less than 2 mm, a segregation zone of an oxidization resistant element may not be removed, resulting in surface defects. When a thickness to be performed by melting treatment exceeds 5 mm, a problem of deteriorating an actual yield may occur.

In addition, the method may include reheating a steel slab obtained after the melting treatment at 1180 to 1230° C., and hot-rolling the reheated steel slab at Ar3 or higher to provide a hot-rolled steel sheet. In this case, when a reheating temperature of the slab is less than 1180° C., a problem for production may occur due to a rolling load of an FM zone, and when a reheating temperature of the slab exceeds 1230° C., surface scale defects may occur. In addition, hot-rolling may be performed such that a finish rolling temperature is higher than Ar3, and more specifically, may be performed at 880 to 970° C. When the finish rolling temperature of the hot-rolling is less than 880° C., it may be cooled in an two-phase region (i.e., less than Ar3) to generate a coarse grain in a surface layer, and accordingly, a size of a crystal grain in the surface layer may be non-uniform, which may eventually cause a problem in clarity. When the temperature exceeds 970° C., the size of the crystal grains may not be sufficiently fine, resulting in insufficient strength of a final material.

In addition, according to an aspect of the present disclosure, coiling of the hot-rolled steel sheet may be performed at 600 to 650° C. When a coiling temperature is less than 600° C., since precipitates such as (Ti, Nb) C or the like may not be sufficiently generated, they may be precipitated during annealing and may affect recrystallization and grain growth, resulting in difficulties in securing desired strength and elongation. In addition, when the coiling temperature exceeds 650° C., a problem of poor surface properties may occur due to generation of a secondary hot-rolled scale.

In addition, according to an aspect of the present disclosure, after the coiling the hot-rolled steel sheet, an pickling process may be performed, and the coiled hot-rolled steel sheet may be cold-rolled at a reduction ratio of 70 to 83% to provide a cold-rolled steel sheet. When the reduction ratio during the cold-rolling is less than 70%, a {111} texture may not sufficiently grow, resulting in poor formability. When the reduction ratio exceeds 83% during the cold-rolling, a problem may arise because the rolling roll load may be very severe during on-site manufacturing to deteriorate a shape thereof. Therefore, the reduction ratio may be controlled to 70 to 83%, and more preferably, may be controlled to 74 to 80%.

Then, the cold-rolled steel sheet may be annealed at a temperature of 740 to 830° C., equal to or higher than a recrystallization temperature. By annealing at a temperature, equal to or higher than the recrystallization temperature, deformation caused by rolling may be removed, and the steel sheet may be softened to improve processability. For example, when an annealing temperature is less than 740° C., recrystallization of a ferrite phase may not be completed, resulting in insufficient elongation, and when an annealing temperature exceeds 830° C., after completion of the recrystallization, grain growth may proceed excessively, resulting in a problem of lack of strength.

Although not particularly limited, in the annealing, after heat-treatment at a temperature of 740 to 850° C., primary cooling may be performed at an average cooling rate of 2 to 6° C./s, and secondary cooling may then be performed at an average cooling rate of 6.5 to 15° C./s. The annealing may be performed to satisfy the above conditions, it is possible to control an amount of the composite oxide in an appropriate range near the interface between the base iron and the plating layer, and thereby, it is possible to prevent uneven alloying resulting from the composite oxide formed during the annealing.

In addition, although not particularly limited, according to an aspect of the present disclosure, the annealing may be performed at a dew point temperature of −60 to −20° C. During the annealing, when the dew point temperature is less than −60° C., problems may arise in terms of economic efficiency to maintain an ambient temperature in a furnace, and during the annealing, when the dew point temperature exceeds −20° C., a problem of frequently generating surface oxides may occur.

Further, after the annealing, the cold-rolled steel sheet may be directly subjected to hot-dip zinc-based plating in a continuous hot-dip zinc-based plating line. In this case, the zinc-based plating refers to plating performed by immersing in a plating bath containing 60% or more of Zn. For example, the plating may be performed by immersion in a plating bath containing Al: 0.121 to 0.133%, the balance being Zn, and other unavoidable impurities. Thereafter, alloying heat-treatment may be performed in a range of 500 to 560° C. after the hot-dip zinc-based plating. In this case, when an alloying heat-treatment temperature is less than 500° C., alloying may not sufficiently proceed, and when the temperature exceeds 560° C., excessive alloying may proceed and the plating layer may be embrittled. Therefore, problems such as peeling of the plating due to processing such as pressing or the like, or the like may occur.

In addition, with respect to the steel sheet subjected to the alloying heat-treatment, temper-rolling may be performed at a reduction ratio of 0.6 to 1.2% (which may mean an average reduction ratio) using a skin pass roll having a roughness (Ra) of 1.0 to 1.6 μm. During the temper-rolling, when the roughness (Ra) of the skin pass roll is less than 1.0 μm, it may not be possible to sufficiently suppress surface defects caused by the Mn—Si—O-based composite oxide, and lack of clarity illustrating beautiful surface characteristics after painting. When the roughness (Ra) of the skin pass roll exceeds 1.6 μm during the temper-rolling, a problem in pressability may occur. In addition, when the reduction ratio of the temper-rolling is less than 0.6%, problems such as shape correction or the like may occur, and when the reduction ratio exceeds 1.2%, a problem in which yield strength exceeds a reference value due to a processing hardening effect may occur.

The temper-rolling may be more preferably performed at a reduction ratio of 0.6 to 1.2% using a skin pass roll having a roughness (Ra) of 1.1 to 1.5 μm, from the viewpoint of further improving the above-described effect.

Alternatively, according to an aspect of the present disclosure, although not particularly limited, in the temper-rolling, first temper-rolling may be performed at a reduction ratio of 0.05 to 0.4, and then second temper-rolling may be performed at a reduction ratio of 0.6 to 1.0%. By doing this, it is possible to contribute to securing excellent surface characteristics by suppressing surface defects caused by the composite oxides present in a peripheral region of the interface between the base iron and the plating layer. In this case, an average reduction ratio for the first temper-rolling and the second temper-rolling satisfies the aforementioned reduction ratio of 0.6 to 1.2%.

MODE FOR INVENTION

Hereinafter, the present disclosure will be described in more detail through examples. However, it should be noted that the following Examples were only illustrative for the present disclosure through examples, and were not intended to limit the scope of the present disclosure. This was because the scope of the present disclosure may be determined by matters described in the claims and matters reasonably inferred therefrom.

Experimental Example 1

A steel slab having a thickness of 250 mm and an alloy composition (remaining portions were Fe and other impurities, unit: weight %) illustrated in Tables 1 and 2 was subject to melting treatment to have a thickness of 2 to 4 mm, and reheated to 1230° C., and, under conditions of Table 3 below, was then performed by hot-rolling, coiling, cold-rolling, annealing, plating, and alloying, to prepare a plated steel sheet. In this case, in the annealing, heat-treatment was performed at a dew point temperature of −60 to −20° C. and a temperature of 740 to 850° C., and then, based on the surface temperature of the steel sheet, primary cooling was performed at an average cooling rate of 2 to 6° C./s to reach a temperature of 650° C., and secondary cooling was performed at an average cooling rate of 6.5 to 15° C./s to reach a temperature of 550° C. In addition, during the plating, alloying hot-dip galvanizing was performed by immersing in a zinc plating bath containing Al: 0.121 to 0.133%, balance of Zn, and other unavoidable impurities.

For the plated steel sheet obtained in this manner, an oxide occupation ratio (an [Ao]/[At] value) according to the relationship 2 was measured using a transmission electron microscopy (TEM)-energy dispersive spectroscopy (EDS) device. Specifically, an area near an interface between a base iron and a hot-dip galvanized layer of a cross-section of a hot-dip galvanized test piece (a cut surface in the thickness direction) was measured and elemental analyzed to measure the oxide occupancy ratio, and values therefrom were illustrated in Table 4 below.

In addition, yield strength (YS), tensile strength (TS), and elongation at breaking point (El) were measured, and were illustrated in Table 4 below. In this case, after measuring a width of a test piece, a length and a thickness of a parallel portion, the test piece was mounted in a tensile tester, measurement thereof was waited until the test piece was destroyed, and then the yield strength, the tensile strength, and the elongation at breaking point of the test piece were measured. The yield strength may be limit stress when elastic deformation occurs, and may usually show a value through a 0.2% offset, the tensile strength may show a value obtained by dividing a maximum load by an original cross-section, and the elongation at breaking point may show a deformation amount of the test piece in % after fracture from the tensile test. In this case, a case in which the tensile strength was 390 MPa or more and the elongation at breaking point was 15% or more was evaluated as passed.

In addition, evaluation for an r value, which may be an index of deep drawing, was performed by taking a JIS5 tensile test piece from a alloyed hot-dip zinc-based plated steel sheet in three directions relative to the rolling direction: a parallel direction, a 45° direction, and a perpendicular direction, and measuring the r value of each test piece, and the values were then illustrated in Table 4 below. For example, the r value may be measured by measuring a change value of a sheet thickness and a change value of a sheet width when a tensile strain of about 15% was performed in the above tensile test, and calculating a ratio of the change value of the sheet width to the change value of the sheet thickness. Then, if a r value in the parallel direction, parallel to the rolling direction, is $r_0$, a r value in the 45° direction, inclined to 45° relative to the rolling direction, is $r_{45}$, and a r value in the perpendicular direction, perpendicular to the rolling direction, is $r_{90}$, the r values in each of the directions to be described below were obtained from the following relationship A, and a case in which the value was 1.2 or more was evaluated as passed.

$$r = r_0 + 2*r_{45} + r_{90}/4 \qquad \text{[Relationship A]}$$

Surface properties (whether a white defect occurs or not) of the alloyed hot-dip galvanized steel sheet were evaluated, and results thereof were illustrated in Table 4 below. In this case, a method and criteria for evaluating the surface properties were set as follows.

For the surface quality, an appearance of the plated steel sheet was observed with naked eyes, as a degree to which an alloyed hot-dip galvanized layer was well coated on the base steel sheet. After annealing heat-treatment of the cold-rolled steel sheet (F/H) under normal continuous annealing line conditions, when an oxide was excessively or non-uniformly generated on a surface of the base iron, an uneven plating layer was formed due to a difference in alloying speed, and a defect was generated in white in a region in which the plating layer was relatively thickly formed. When the corresponding defect appears, it is impossible to use it for an external plate of a vehicle. Therefore, the presence or absence of the white defect was set as a criterion for determining surface properties.

TABLE 1

| Steel Type | C | Si | P | Mo | Mn | Cu | S | N |
|---|---|---|---|---|---|---|---|---|
| Inventive Steel 1 | 0.004 | 0.025 | 0.048 | 0.05 | 0.48 | 0.08 | 0.0023 | 0.0013 |
| Inventive Steel 2 | 0.0038 | 0.03 | 0.051 | 0.053 | 0.51 | 0.07 | 0.0034 | 0.0017 |
| Inventive Steel 3 | 0.005 | 0.031 | 0.057 | 0.0576 | 0.48 | 0.08 | 0.0021 | 0.0015 |
| Inventive Steel 4 | 0.007 | 0.034 | 0.062 | 0.062 | 0.51 | 0.069 | 0.003 | 0.002 |
| Inventive Steel 5 | 0.0064 | 0.042 | 0.079 | 0.068 | 0.62 | 0.078 | 0.0028 | 0.0013 |
| Inventive Steel 6 | 0.006 | 0.032 | 0.082 | 0.072 | 0.61 | 0.08 | 0.0032 | 0.0015 |
| Inventive Steel 7 | 0.008 | 0.036 | 0.089 | 0.078 | 0.67 | 0.09 | 0.0021 | 0.0013 |
| Inventive Steel 8 | 0.0071 | 0.024 | 0.056 | 0.08 | 0.5 | 0.1 | 0.0015 | 0.0017 |
| Comparative Steel 1 | 0.004 | 0.1 | 0.09 | 0.01 | 0.5 | 0.02 | 0.0022 | 0.0012 |
| Comparative Steel 2 | 0.0028 | 0.1 | 0.037 | 0.005 | 0.72 | 0.05 | 0.0028 | 0.0018 |
| Comparative Steel 3 | 0.012 | 0.15 | 0.045 | 0.001 | 0.9 | 0.5 | 0.0032 | 0.002 |
| Comparative Steel 4 | 0.01 | 0.3 | 0.025 | 0.3 | 0.87 | 0.62 | 0.0027 | 0.0015 |

TABLE 2

| Steel Type | Al | Ti | Nb | B | [Relationship 1] 10 × [Si]/[Mn] |
|---|---|---|---|---|---|
| Inventive Steel 1 | 0.0347 | 0.01 | 0.035 | 0.0008 | 0.52 |
| Inventive Steel 2 | 0.0361 | 0.008 | 0.033 | 0.0004 | 0.59 |
| Inventive Steel 3 | 0.0355 | 0.007 | 0.038 | 0.0006 | 0.65 |
| Inventive Steel 4 | 0.0345 | 0.009 | 0.028 | 0.0007 | 0.67 |
| Inventive Steel 5 | 0.0346 | 0.012 | 0.045 | 0.0006 | 0.68 |
| Inventive Steel 6 | 0.0390 | 0.011 | 0.041 | 0.0008 | 0.52 |
| Inventive Steel 7 | 0.0410 | 0.008 | 0.044 | 0.0007 | 0.54 |
| Inventive Steel 8 | 0.0290 | 0.01 | 0.034 | 0.0004 | 0.48 |
| Comparative Steel 1 | 0.0389 | 0.05 | 0.021 | 0.001 | 2.00 |
| Comparative Steel 2 | 0.0405 | 0.02 | 0.02 | 0.008 | 1.39 |
| Comparative Steel 3 | 0.0391 | 0.045 | 0.012 | 0.007 | 1.67 |
| Comparative Steel 4 | 0.0354 | 0.045 | 0.045 | 0.008 | 3.45 |

Ar3 = 910 − 310 × [C] − 80 × [Mn] − 20 × [Cu] − 15 × [Cr] − 55 × [Ni] − 80 × [Mo] − 0.35 × (Thickness − 8)

TABLE 3

| Steel Type | Example | FDT* [° C.] | CT* [° C.] | Cool Reduction Ratio [%] | Anneal Temp. [° C.] | GA Temp. [° C.] | Ra* [μm] | Temper-Roll Reduction Ratio [%] |
|---|---|---|---|---|---|---|---|---|
| Inventive Steel 1 | Inventive Example 1 | 915 | 622 | 77 | 770 | 520 | 1.1 | 0.8 |
| Inventive Steel 2 | Inventive Example 2 | 932 | 620 | 77 | 765 | 525 | 1.1 | 0.8 |
| Inventive Steel 3 | Inventive Example 3 | 940 | 618 | 77 | 780 | 525 | 1.3 | 0.6 |
| Inventive Steel 4 | Inventive Example 4 | 830 | 615 | 71 | 750 | 530 | 1.1 | 1.2 |
| Inventive Steel 5 | Inventive Example 5 | 920 | 620 | 71 | 742 | 530 | 1.5 | 0.9 |
| Inventive Steel 6 | Inventive Example 6 | 925 | 635 | 75 | 800 | 545 | 1.1 | 0.8 |
| Inventive Steel 7 | Inventive Example 7 | 930 | 612 | 75 | 810 | 545 | 1.1 | 1.1 |
| Inventive Steel 8 | Inventive Example 8 | 933 | 622 | 71 | 790 | 520 | 1.3 | 0.8 |
| Comparative Steel 1 | Comparative Example 1 | 923 | 690 | 70 | 720 | 530 | 1.1 | 1.0 |
| Comparative Steel 2 | Comparative Example 2 | 911 | 618 | 70 | 780 | 530 | 1.1 | 0.5 |
| Comparative Steel 3 | Comparative Example 3 | 880 | 620 | 70 | 780 | 530 | 1.3 | 0.8 |
| Comparative Steel 4 | Comparative Example 4 | 903 | 618 | 70 | 780 | 530 | 1.1 | 0.9 |

FDT*: finish rolling
CT*: coiling
Ra*: skin pass roll roughness

TABLE 4

| Example | [Relationship 2] [Ao]/[At] Value | YS [MPa] | TS [MPa] | El [%] | r Value | Surface White Defect |
|---|---|---|---|---|---|---|
| Inventive Example 1 | 0 | 275 | 410 | 35 | 1.7 | Good |
| Inventive Example 2 | 0 | 250 | 415 | 35 | 1.6 | Good |
| Inventive Example 3 | 0 | 235 | 412 | 32 | 1.6 | Good |
| Inventive Example 4 | 0 | 320 | 452 | 15 | 1.5 | Good |
| Inventive Example 5 | 0.08 | 311 | 445 | 17 | 1.4 | Good |
| Inventive Example 6 | 0 | 290 | 450 | 29 | 1.6 | Good |
| Inventive Example 7 | 0 | 300 | 451 | 32 | 1.6 | Good |
| Inventive Example 8 | 0 | 270 | 411 | 38 | 1.7 | Good |
| Comparative Example 1 | 0.35 | 620 | 694 | 8 | 0 | Poor |
| Comparative Example 2 | 0.27 | 225 | 356 | 39 | 1.9 | Poor |
| Comparative Example 3 | 0.25 | 226 | 378 | 35 | 1.5 | Poor |
| Comparative Example 4 | 0.44 | 341 | 575 | 7 | 0.1 | Poor |

Figure 1:
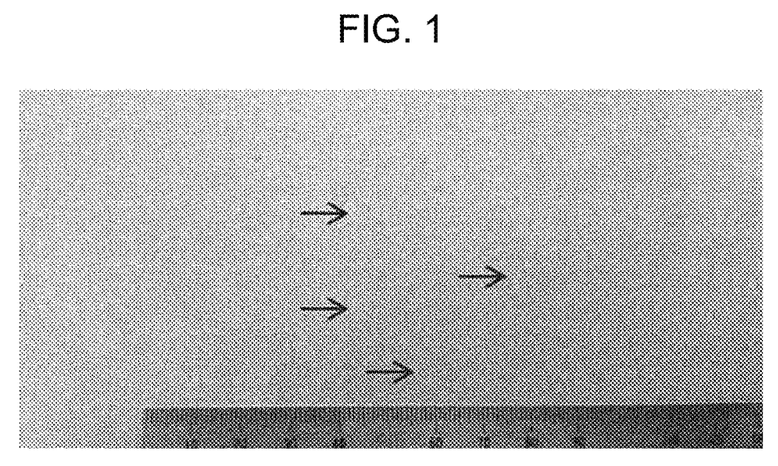
FIG. 1 is a photograph of a surface of a plated steel sheet obtained from Comparative Example 4 of the present specification, captured using an optical camera at a magnification of 1.
Figure 2:
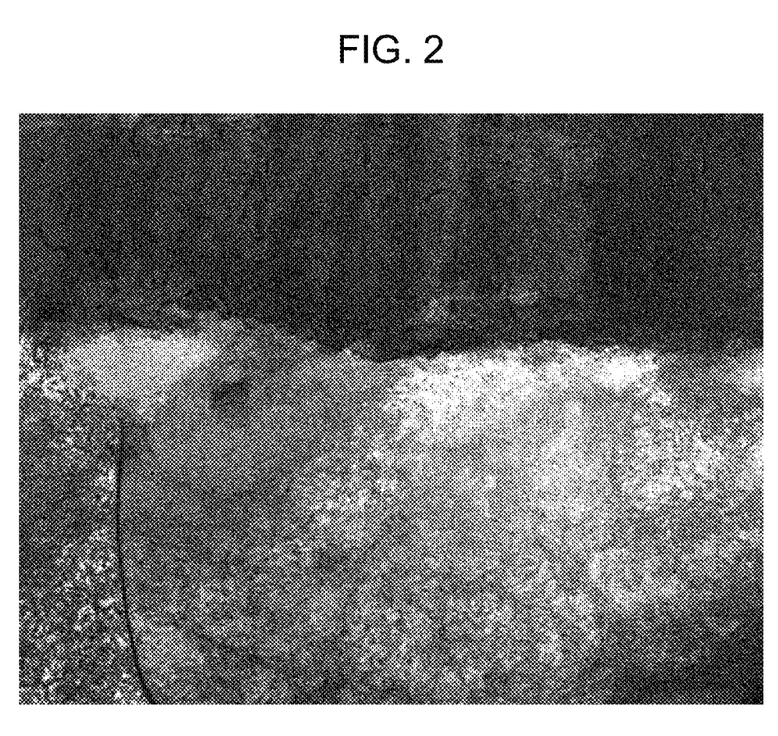
FIG. 2 is a photograph of a cross-section in a thickness direction of a plated steel sheet obtained from Inventive Example 4 of the present disclosure, and is a photograph of a peripheral region of an interface between a base iron and a plating layer, captured using a transmission electron microscope (TEM) device at a magnification of 40,000.
Figure 3:
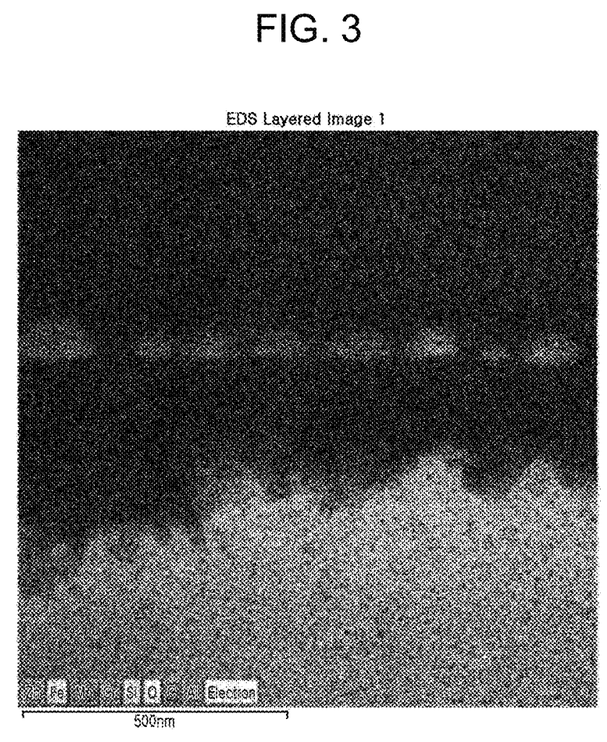
FIG. 3 is a photograph of a cross-section in a thickness direction of a plated steel sheet obtained from Comparative Example 2 of the present disclosure, and is a photograph of a peripheral region of an interface between a base iron and a plating layer, captured using an EDS at a magnification of 100,000.

As can be seen from experimental results of Tables 1 to 4, in Inventive Examples 1 to 8 that satisfy the relationships 1 and 2 by satisfying a composition of the base iron and manufacturing conditions of the present disclosure, it was confirmed that the microstructure of the base iron for the plated steel sheet was a ferrite single phase using an area fraction thereof, and it was confirmed that tensile strength thereof was 390 MPa or more, yield strength thereof was 230 to 330 MPa, which range indicates high strength, and elongation at breaking point thereof was 15% or more, which range indicates not only excellent formability, but also good surface properties. Thereamong, a photograph of a cross-section in a thickness direction of a plated steel sheet obtained from Inventive Example 4 of the present disclosure is illustrated in FIG. 2. Specifically, FIG. 2 is a photograph of a peripheral region of an interface between a base iron and a plating layer, captured using a transmission electron microscope (TEM) at a magnification of In Comparative Examples 1 to 4, values of 10×[Si]/[Mn] in relationship 1 exceeded 1.3, and occupation ratios [Ao]/[At] of composite oxides according to relationship 2 did not satisfy the scope of the present disclosure. Therefore, it was confirmed that white defects occurred due to non-uniform plating layers. Thereamong, a photograph of a surface of a plated steel sheet obtained from Comparative Example 4 of the present specification, captured using an optical camera at a magnification of 1 is illustrated in FIG. 1, and it was confirmed with naked eyes that white defects occurred. In addition, a photograph of a cross-section in a thickness direction of a plated steel sheet obtained from Comparative Example 2 of the present disclosure is illustrated in FIG. 3, and as illustrated in FIG. 3, it was confirmed that the Mn—Si—O-based composite oxide was present near the interface between the base iron and the plating layer.

Experimental Example 2

In temper-rolling, a plated steel sheet was prepared in the same manner as in the above-described experimental example 1 of finish rolling, coiling, cold-rolling, annealing, plating, and alloying treatment under conditions of Table 5 below, except for performing first and second temper-rolling under conditions illustrated in Table 5 below.

TABLE 5

| Steel Type | Example | FDT* [° C.] | CT* [° C.] | Cool Reduction Ratio [%] | Anneal Temp. [° C.] | GA Temp. [° C.] | Ra* [μm] | Temper-Rolling | | |
|---|---|---|---|---|---|---|---|---|---|---|
| | | | | | | | | First Reduction Ratio [%] | Second Reduction Ratio [%] | Average Reduction Ratio [%] |
| Inventive Steel 1 | Inventive Example 9 | 915 | 622 | 77 | 770 | 520 | 1.1 | 0.01 | 1.3 | 0.66 |
| | Inventive Example 10 | | | | | | 1.1 | 0.05 | 0.6 | 0.33 |
| | Inventive Example 11 | | | | | | 1.1 | 0.4 | 1.0 | 0.7 |
| | Inventive Example 12 | | | | | | 1.1 | 0.5 | 1.2 | 0.85 |
| Inventive Steel 5 | Inventive Example 13 | | | | | | 1.1 | 0.4 | 1.0 | 0.7 |
| Comparative Steel 2 | Comparative Example 5 | 911 | 618 | 70 | 780 | 530 | 0.5 | 0.5 (First Temper-Rolling) | | |

For each plated steel sheet obtained by the above method, average diameters of Mn—Si—O composite oxides were measured, and occupancy ratios of composite oxides, yield strength, tensile strength, elongation at breaking point, r values, and surface white defects were evaluated, and illustrated in Table 6 below. In addition, average diameters of Mn—Si—O-based composite oxides and average grain sizes of ferrite were measured in the same manner as the method described herein, and illustrated in Table 6 below.

TABLE 6

| Example | [Relationship 2] [Ao]/[At] | Mn—Si—O-based Composite Oxide Average Diameter [nm] | Ferrite Average Grain Size [μm] | YS [MPa] | TS [MPa] | El [%] | r Vale | Surface White Defect |
|---|---|---|---|---|---|---|---|---|
| Inventive Example 9 | 0 | — | 7.2 | 275 | 410 | 35 | 1.7 | Good |
| Inventive Example 10 | 0 | — | 7.2 | 277 | 410 | 35 | 1.7 | Very Good |
| Inventive Example 11 | 0 | — | 7.2 | 282 | 411 | 35 | 1.7 | Very Good |
| Inventive Example 12 | 0 | — | 7.2 | 284 | 412 | 34 | 1.6 | Good |
| Inventive Example 13 | 0.08 | 63 | 4 | 311 | 445 | 17 | 1.4 | Very Good |
| Comparative Example 5 | 0.19 | 107 | 14 | 225 | 356 | 39 | 1.9 | Poor |

As can be seen in Table 6, in Comparative Example 5, not satisfying a composition of the base iron and manufacturing conditions of the present disclosure, relationships 1 and 2 were not satisfied, and as a result, tensile strength thereof was less than 390 MPa, resulting in insufficient strength, and a white defect occurred due to a non-uniform plating layer.

In contrast, in Inventive Examples 9 to 13 satisfying a composition of the base iron and manufacturing conditions of the present disclosure, the relationships 1 and 2 were satisfied, and had not only excellent strength, but good surface properties, as compared to Comparative Example 5.

In addition, based on a cross-section in the thickness direction of the plated steel sheet manufactured from the above-described Inventive Example 13, if a line from which an interface line having a length of 500 nm between the base iron and the plating layer was spaced 0.3 μm apart in a thickness direction facing the plating layer, was drawn, based on a cross-section of the plated steel sheet, it was confirmed that an area occupied by an Mn—Si—O-based composite oxide in a region between the spaced line and the interface line was an area occupied by an Mn—Si—O-based composite oxide in a region between the spaced line and a surface line of the plating layer.

In particular, in Inventive Examples 10 and 11 in which first temper-rolling having a reduction ratio of 0.05 to 0.4% and second temper-rolling having a reduction ratio of 0.6 to 1.0% were performed during temper-rolling, it was confirmed that deep drawability and surface properties were further improved, as compared to Inventive Examples 9 and 12, which did not satisfy the conditions for first temper-rolling and secondary temper-rolling.

In a test piece having a good surface white defect, the defects illustrated in FIG. 1 was not confirmed in terms of appearance, and in a test piece having a very good quality, a defect was not observed in terms of appearance. In addition, when a cross-section of a plating layer was observed using a scanning electron microscope (SEM), it can be confirmed from the fact that deviation between a minimum thickness and a maximum thickness [(maximum thickness−minimum thickness)/(maximum thickness)] in a single-sided plating layer did not exceed 0.1.

DESCRIPTION OF REFERENCE CHARACTERS

1: Base iron
2: Plating layer
10: Interface line having total interface length of 500 nm or more between base iron and plating layer
20: Line from which interface line is 0.3 μm spaced apart in direction, parallel to thickness direction At: Area of region between interface line 10 and spaced line 20
100: Mn—Si—O-based complex oxide
Ao: Area occupied by Mn—Si—O-based composite oxide 100 existing in region between interface line 10 and spaced line 20

The invention claimed is:

1. A plated steel sheet comprising:
a base iron; and
a plating layer formed on the base iron,
wherein the base iron includes, by weight, C: 0.003 to 0.009%, Si: 0.05% or less (excluding 0%), Mn: 0.4 to 1.0% (excluding 0%), P: 0.04 to 0.09%, S: 0.01% or less (excluding 0%), N: 0.005% or less (excluding 0%), Sol.Al: 0.1% or less (excluding 0%), Mo: 0.03 to 0.08%, Ti: 0.005 to 0.03%, Nb: 0.02 to 0.045%, Cu: 0.04 to 0.15%, B: 0.0015% or less (excluding 0%), and a balance of Fe and other unavoidable impurities,
wherein the plated steel sheet satisfies the following relationships 1 and 2:

$$0 < 10 \times [Si]/[Mn] \leq 1.3 \quad \text{[Relationship 1]}$$

in relationship 1, [Si] represents an average weight % amount of Si in the base iron, and [Mn] represents an average weight % amount of Mn in the base iron; and $$0 \leq [Ao]/[At] \leq 0.15 \quad \text{[Relationship 2]}$$

in relationship 2, [At] represents an area of a region between an interface line and a spaced line, and [Ao] represents an area occupied by an Mn—Si—O-based composite oxide in the region, wherein the interface line is defined by a line having a length of 500 nm or more between the base iron and the plating layer on a cross-section of the plated steel sheet, and the spaced line is defined by a line spaced apart by 0.3 μm from the interface line in a thickness direction facing the plating layer on the cross-section of the plated steel sheet.

2. The plated steel sheet of claim 1, wherein an average diameter of the Mn—Si—O-based composite oxide is 200 nm or less.

3. The plated steel sheet of claim 1, wherein the area occupied by the Mn—Si—O-based composite oxide in the region is larger than an area occupied by the Mn—Si—O-based composite oxide in a region between the spaced line and a surface line of the plating layer.

4. The plated steel sheet of claim 1, wherein a tensile strength is 390 MPa or more, and an elongation is 15% or more.

5. The plated steel sheet of claim 1, wherein the base iron includes a microstructure comprising: 99% or more of ferrite and a balance of perlite, in an area fraction.

6. The plated steel sheet of claim 5, wherein an average grain size of the ferrite is 5 to 15 μm.

* * * * *